United States Patent
Cheng

(10) Patent No.: US 7,728,924 B2
(45) Date of Patent: Jun. 1, 2010

(54) BACKLIGHT MODULE WITH LIGHT GUIDE PLATE HAVING PROTRUSION AND LIQUID CRYSTAL DISPLAY DEVICE USING THE SAME

(75) Inventor: Yu-Cheng Cheng, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 247 days.

(21) Appl. No.: 11/974,827

(22) Filed: Oct. 16, 2007

(65) Prior Publication Data

US 2008/0088772 A1    Apr. 17, 2008

(30) Foreign Application Priority Data

Oct. 16, 2006    (TW) ............... 95138075 A

(51) Int. Cl.
*G02F 1/1335*    (2006.01)
(52) U.S. Cl. ............... 349/65; 349/67; 362/615; 362/609
(58) Field of Classification Search ............ 349/65, 349/67, 70; 362/615, 611, 612, 614, 621, 362/609, 617, 619
See application file for complete search history.

(56) References Cited

U.S. PATENT DOCUMENTS

| 6,064,455 | A | 5/2000 | Kim | |
|---|---|---|---|---|
| 6,191,833 | B1 * | 2/2001 | Hirakata | 349/61 |
| 6,979,113 | B2 * | 12/2005 | Nakano | 362/633 |
| 7,077,554 | B2 * | 7/2006 | Kim et al. | 362/603 |
| 7,458,711 | B2 * | 12/2008 | Cheng | 362/621 |
| 2006/0146574 | A1 * | 7/2006 | Fu et al. | 362/621 |

FOREIGN PATENT DOCUMENTS

CN    2769945 Y    4/2006

* cited by examiner

*Primary Examiner*—Thoi V Duong
(74) *Attorney, Agent, or Firm*—Wei Te Chung

(57) ABSTRACT

An exemplary backlight module (2) includes a light guide plate (21) and a light source (23). The light guide plate includes a main body, a protrusion (217) extending from an end of the main body, a main light emitting surface (211), and a light incident surface (215) at the end of the main body. Wherein one side of the protrusion forms a part of the light emitting surface, another side (2171) of the protrusion is adjacent to the light incident surface. The protrusion and the light incident surface cooperatively form an accommodating space. The light source is substantially received in the accommodating space.

14 Claims, 4 Drawing Sheets

US 7,728,924 B2

BACKLIGHT MODULE WITH LIGHT GUIDE PLATE HAVING PROTRUSION AND LIQUID CRYSTAL DISPLAY DEVICE USING THE SAME

FIELD OF THE INVENTION

The present invention relates to backlight modules and liquid crystal display (LCD) devices; and particularly to a backlight module with a light guide plate having a protrusion, and an LCD device using the backlight module.

BACKGROUND

LCD devices are commonly used as display devices for compact electronic apparatuses. This is because LCD devices not only provide good quality images, but also are very thin and consume little power. The liquid crystal in a liquid crystal display device is not capable of emitting light by itself. The liquid crystal has to be lit by a light source so as to clearly and sharply display text and images. Thus, a backlight module for an LCD is generally needed.

FIG. 9 is an exploded, isometric view of a typical backlight module. The backlight module 1 includes a light guide plate (LGP) 11, a light source 13, and a set of optical films 15 disposed on the LGP 11. The LGP 11 includes a top light emitting surface 111, a bottom surface 113, and a side light incident surface 115. The light source 13 is located adjacent to the light incident surface 115. The light source 13 includes a cold cathode fluorescence lamp (CCFL) 131, a U-shaped reflector 133 partially enclosing the CCFL 131, and two rubber blocks 135 engaged with two ends of the CCFL 131 respectively.

In FIG. 10, an exploded, side view of the backlight module 1 is shown. The two parallel sidewalls of the U-shaped reflector 133 are engaged with end portions of the light emitting surface 111 and the bottom surface 113 respectively, in order to hold the U-shaped reflector 133 in place at an end of the LGP 11. The two rubber blocks 135 are fittingly engaged in two ends of the U-shaped reflector 133, and contact the light incident surface 115 of the LGP 11.

If the LGP 11 sustains shock or undergoes vibration, only the two rubber blocks 135 absorb mechanical force that transmits from the LGP 11 to the CCFL 131. Thus, when the backlight module 1 experiences shock, the CCFL 131 is liable to be damaged. In addition, if the U-shaped reflector 133 becomes distorted, light beams emitted by the CCFL 131 may leak out from the backlight module 1. This leads to a decrease in the light utilization efficiency of the backlight module 1. Furthermore, because the set of optical films 15 is close to the light source 13, during operation of the light source 13 the surrounding temperature of the light source 13 rises. This may result in the set of optical films 15 becoming too hot and distorting.

What is needed is a backlight module and an LCD device with the backlight module which can overcome the above-described deficiencies.

SUMMARY

An exemplary backlight module includes a light guide plate and a light source. The light guide plate includes a main body, a protrusion extending from an end of the main body, a main light emitting surface, and an light incident surface at the end of the main body. Wherein one side of the protrusion forms a part of the light emitting surface, another side of the protrusion is adjacent to the light incident surface, and the protrusion and the light incident surface cooperatively form an accommodating space. The light source is substantially received in the accommodating space.

Another exemplary A backlight module includes a light guide plate, and a light source. Wherein an end of the light guide plate defines a channel which is bounded by two sides of the light guide plate. The light source is substantially accommodated in the channel, and light beams from the light source enter the light guide plate through one of said two sides.

An exemplary LCD device includes a liquid crystal display panel and a backlight module for providing light beams to illuminate the liquid crystal display panel. The backlight module includes a light guide plate and a light source. The light guide plate includes a main body, a protrusion extending from an end of the main body, a main light emitting surface, and a light incident surface at the end of the main body. One side of the protrusion forms a part of the light emitting surface, another side of the protrusion is adjacent to the light incident surface, and the protrusion and the light incident surface cooperatively form an accommodating space. The light source is substantially received in the accommodating space.

Other novel features and advantages will become more apparent from the following detailed description when taken in conjunction with the accompanying drawings. In the drawings, all the views are schematic.

DETAILED DESCRIPTION OF PREFERRED EMBODIMENTS

Figure 1:
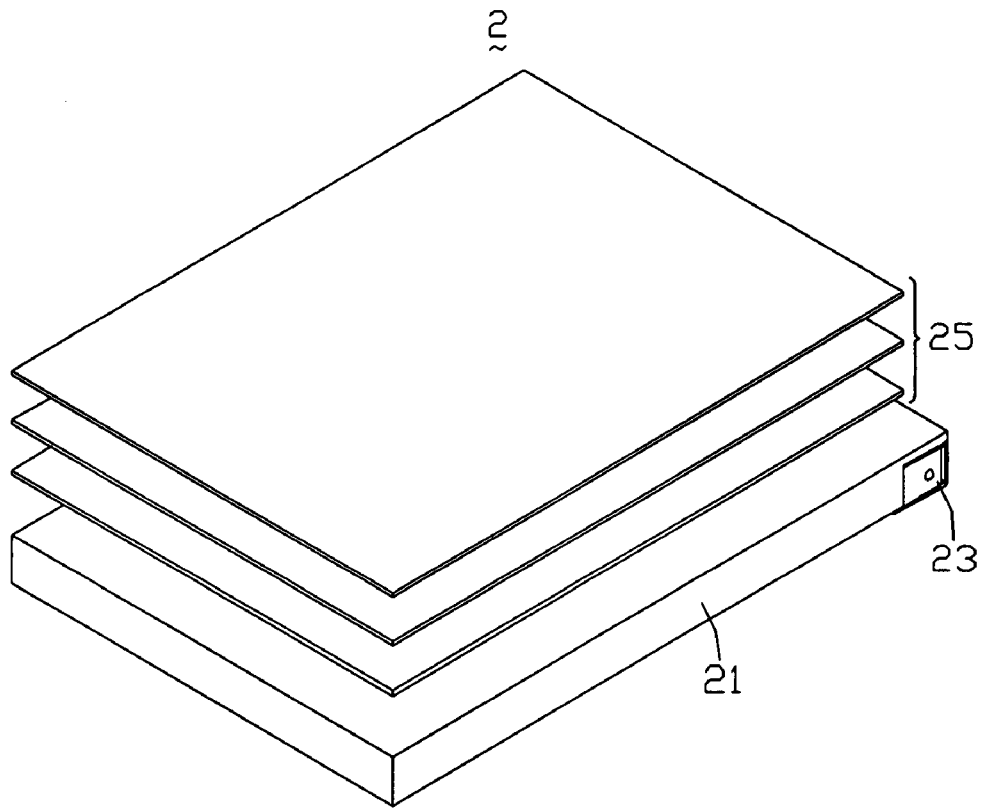
FIG. 1 is an exploded, isometric view of a backlight module according to a first embodiment of the present invention.

Referring to FIG. 1, an exploded, isometric view of a backlight module 2 according to a first embodiment of the present invention is shown. The backlight module 2 includes an LGP 21, a light source 23 adjacent to the LGP 21, and a set of optical films 25 disposed on the LGP 21.

Figure 2:
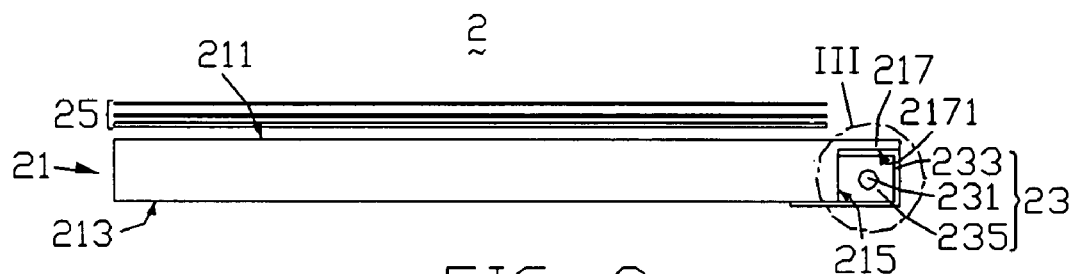
FIG. 2 is an exploded, side view of the backlight module of FIG. 1.

Also referring to FIG. 2, the LGP 21 includes a light emitting surface 211, and a bottom surface 213 on an opposite side of the LGP 21 to the light emitting surface 211. A light incident surface 215 of the LGP 21 is located perpendicular to the light emitting surface 211. A protrusion 217 extends from a main body of the LGP 21. A top of the protrusion 217 forms a part of the light emitting surface 211, and a bottom of the protrusion 217 adjoins the light incident surface 215. The LGP 21 having the protrusion 217 can be made by means of injection molding or milling. The protrusion 217 includes a lower surface 2171 adjoining the light incident surface 215. The lower surface 2171 and the light incident surface 215 cooperatively define an accommodating space (not labeled) therebetween to accommodate the light source 23. The light source 23 includes a lamp 231, a U-shaped reflector 233 partially enclosing the lamp 231, and two rubber blocks 235 disposed around two ends of the lamp 231 respectively. The lamp 231 can be a CCFL. When the light source 23 is accommodated in the accommodating space, the lamp 231 is adjacent to the light incident surface 215.

Figure 3:
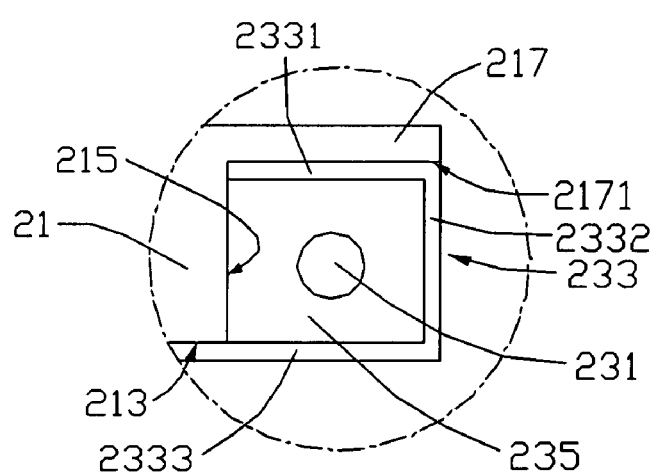
FIG. 3 is an enlarged view of a circled portion III of FIG. 2.

Also referring to FIG. 3, the reflector 233 includes a first sidewall 2331, a third sidewall 2333, and a second sidewall 2332 vertically connecting with the first sidewall 2331 and the third sidewall 2333. The first sidewall 2331 contacts the lower surface 2171 of the protrusion 217. The third sidewall 2333 is longer than the first sidewall 2331, and extends under part of the bottom surface 213 of the LGP 21. The two rubber blocks 235 are fittingly engaged in two ends of the reflector 233, and contact the light incident surface 215 of the LGP 21.

In assembly of the backlight module 2, first, the light source 23 is set in position on an assembly table. The LGP 21 is placed so that the protrusion 217 covers the light source 23. The first sidewall 2331 abuts the lower surface 2171, the third sidewall 2333 partially overlaps the bottom surface 213, and the rubber blocks 235 contact the light incident surface 215. Finally, the set of optical films 25 are put on the light emitting surface 211 of the LGP 21.

A portion of the light beams emitted by the light source 23 directly enter the LGP 21 through the light incident surface 215. Another portion of the light beams travel to the reflector 233, are reflected by the reflector 233, and then enter the LGP 21 through the light incident surface 215. The LGP 21 guides the light beams and transforms them into so-called surface light, which emits from the light emitting surface 211. The set of optical films 25 is used for enhancing and diffusing the surface light.

With the above-described configurations, the light source 23 is held firmly in position. In addition, both the reflector 233 and the rubber blocks 235 can absorb force that transmits from the LGP 21 to the lamp 231. Therefore the lamp 231 is effectively protected from being damaged by shock sustained by the LGP 21. Furthermore, the first sidewall 2331 of the reflector 233 abuts the lower surface 2171 of the protrusion 217, and the third sidewall 2333 abuts part of the bottom surface 213 of the LGP 21. Thus the light source 23 and the LGP 21 are held closely together, in order to eliminate phenomena such as light leakage, bright lines, and the like. Moreover, because the protrusion 217 is between the light source 23 and the set of optical films 25, when the light source 23 is working, the protrusion 217 can absorb part of thermal energy emitted from the light source 23. This can prevent the thermal energy from reaching the set of optical films 25. Therefore, the set of optical films 25 is protected from distortion due to overheating.

Figure 4:
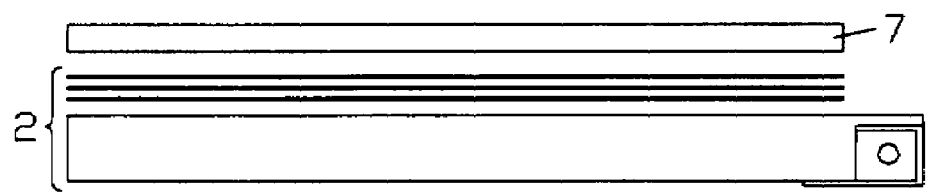
FIG. 4 is an exploded, side view of a liquid crystal display device, which has the backlight module of FIG. 1 installed therein.

FIG. 4 is a side view of an LCD device which has the backlight module 2 installed therein. The LCD device 6 includes an LCD panel 7, and the backlight module 2 disposed under the LCD panel 7. The backlight module 2 is used for providing light beams to illuminate the LCD panel 7.

Figure 5:
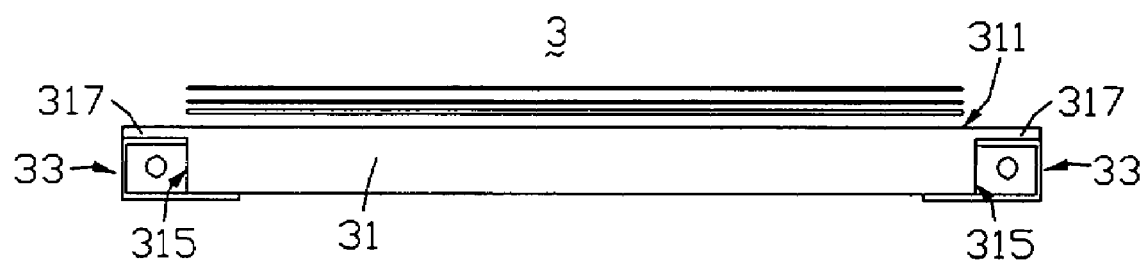
FIG. 5 is an exploded, side view of a backlight module according to a second embodiment of the present invention.

Referring to FIG. 5, this is a backlight module 3 according to a second embodiment of the present invention. The backlight module 3 has a structure similar to that of the backlight module 2. However, an LGP 31 includes two light incident surfaces 315 at two opposite sides thereof. Two protrusions 317 are located at the two opposite sides of the LGP 31. A top of each protrusion 317 forms a part of a light emitting surface 311, and a bottom of each protrusion 317 adjoins the corresponding light incident surface 315. The two light sources 33 are arranged under the two protrusions 317 respectively.

Figure 6:
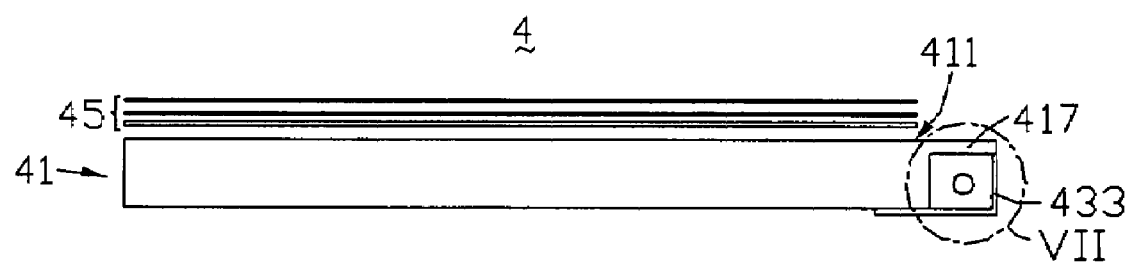
FIG. 6 is an exploded, side view of a backlight module according to a third embodiment of the present invention.
Figure 7:
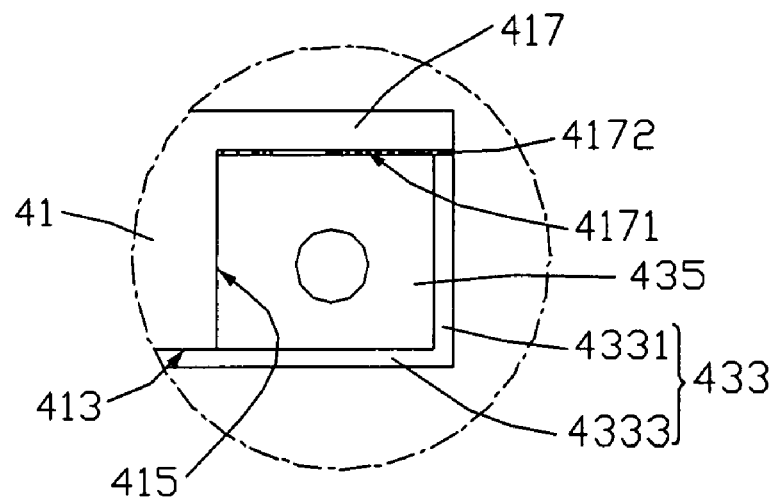
FIG. 7 is an enlarged view of a circled portion VII of FIG. 6.

Referring to FIG. 6 and FIG. 7, a backlight module 4 according to a third embodiment of the present invention has a structure similar to that of the backlight module 2. However, the backlight module 4 includes an LGP 41 and an L-shaped reflector 433. A reflective layer 4172 is attached to a lower surface 4171 of a protrusion 417 of the LGP 41. The reflective layer 4172 can be a film made of reflective material. Such film can for example be a coating of metallic material. The metallic material can be silver, zinc, or another suitable metal or alloy. The reflector 433 includes a first sidewall 4331, and a second sidewall 4333 extending from the first sidewall 4331. A top end of the first sidewall 4331 abuts the reflective layer 4172. The second sidewall 4333 extends under part of the bottom surface 413 of the LGP 41.

In the assembly of the backlight module 4, first, the light source 43 is set in position on an assembly table. The LGP 41 is placed so that the protrusion 217 covers the light source 43. The top end of the first sidewall 4331 abuts the reflective layer 4172, the second sidewall 4333 is engaged with part of the bottom surface 413, and the rubber blocks 435 contact the light incident surface 415. Finally, a set of optical films 45 are put on a light emitting surface 411 of the LGP 41. The set of optical films 45 is used for enhancing and diffusing light beams emitting from the light emitting surface 411.

Because the backlight module 4 has the reflective layer 4172 attached on the lower surface 4171 of the protrusion 417, as well as the reflector 433, the backlight module 4 has a light weight construction. In addition, the backlight module 4 can achieve a high level of light utilization efficiency. Furthermore, when the light source 43 is working, the protrusion 417 can absorb part of thermal energy emitted from the light source 43. This can prevent the thermal energy from reaching the set of optical films 45. Therefore, the set of optical films 45 is protected from distortion due to overheating.

Figure 8:
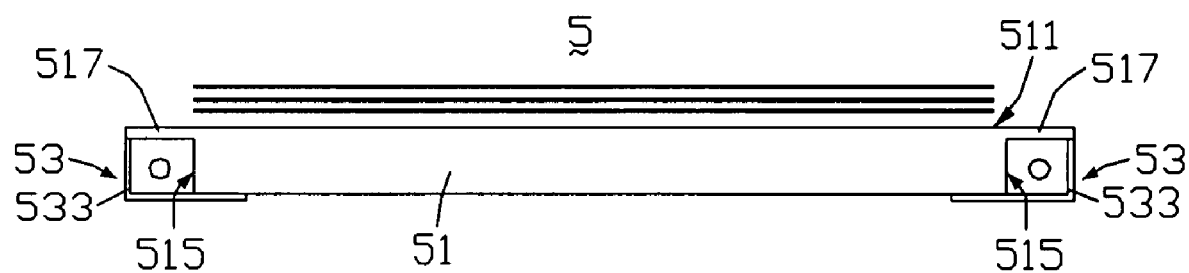
FIG. 8 is an exploded, side view of a backlight module according to a fourth embodiment of the present invention.
Figure 9:
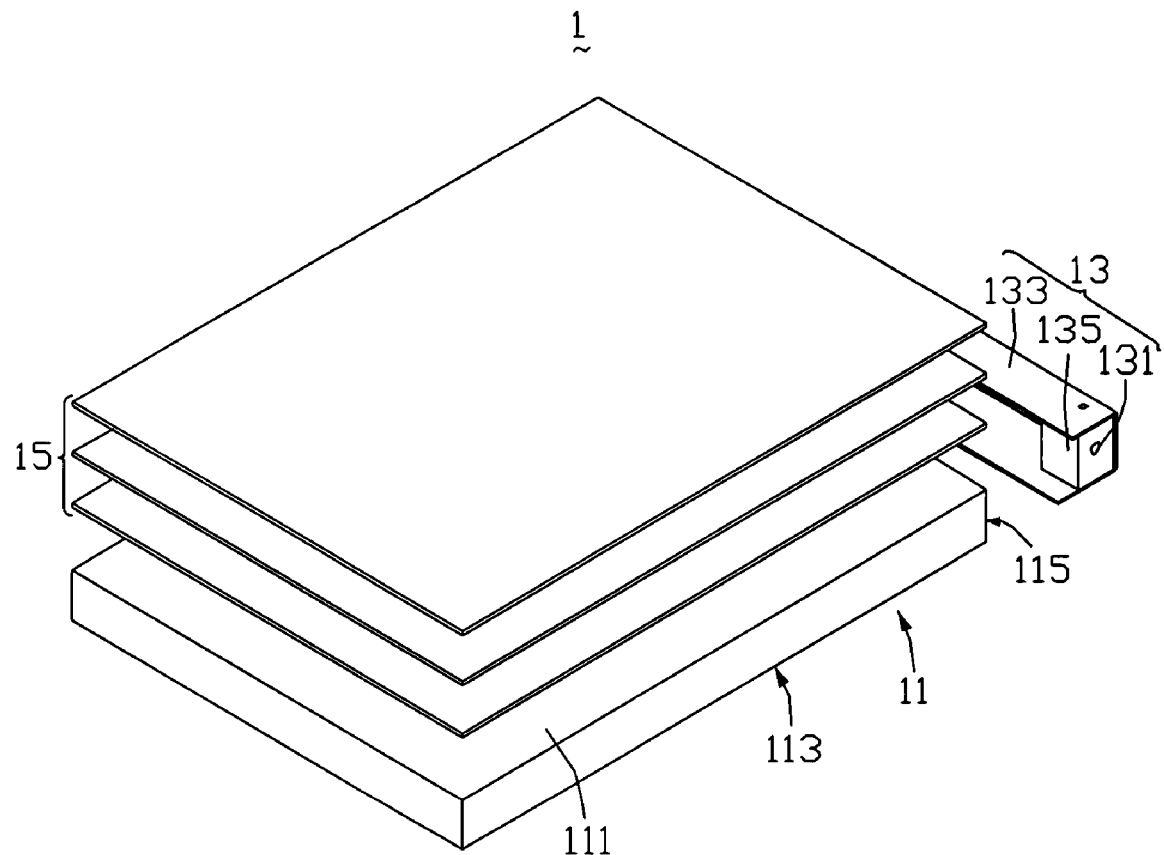
FIG. 9 is an exploded, isometric view of a conventional backlight module.
Figure 10:
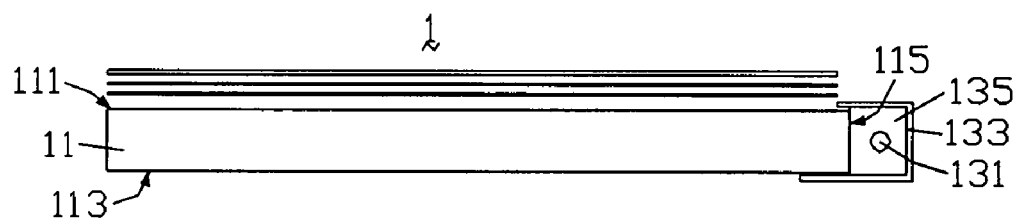
FIG. 10 is an exploded, side view of the backlight module of FIG. 9.

FIG. 8 is an exploded, side view of a backlight module according 5 to a fourth embodiment of the present invention. The backlight module 5 has a structure similar to that of the backlight module 4. However, an LGP 51 includes two light incident surfaces 515 at two opposite sides thereof. Two protrusions 517 are located at the two opposite sides of the LGP 31. A top of each protrusion 317 forms a part of a light emitting surface 511, and a bottom of each protrusion 317 adjoins the corresponding light incident surface 515. Two light sources 53 are arranged under the two protrusions 517 respectively.

The above-described LCD device 6 includes the backlight module 2 by way of example. It is to be understood that in alternative embodiments, the LCD device 6 can instead include any one of the above-described backlight modules 3, 4 and 5.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module, comprising:
   a light guide plate comprising;
      a main body;
      a protrusion extending from an end of the main body;
      a main light emitting surface; and
      a light incident surface at the end of the main body;
      wherein a top surface of the protrusion forms a part of the light emitting surface, a lower surface of the protrusion is adjacent to the light incident surface, and the protrusion and the light incident surface cooperatively form an accommodating space; and
   a light source substantially received in the accommodating space, the light source comprising a lamp and a reflective member partially enclosing the lamp;
      wherein a part of the reflective member is located between the lamp and the lower surface of the protrusion for preventing light emitted by the lamp from entering the protrusion via the lower surface thereof.

2. The backlight module as claimed in claim 1, wherein the reflective member comprises a U-shaped reflector, the U-shaped reflector comprises a first sidewall, a second sidewall, and a third sidewall, and the first sidewall is located between the lamp and the lower surface of the protrusion.

3. The backlight module as claimed in claim 2, wherein the first sidewall abuts the lower surface of the protrusion and the third sidewall extends under part of the light guide plate.

4. The backlight module as claimed in claim 1, wherein the reflective member comprises a reflective layer and an L-shaped reflector, and the L-shaped reflector comprises a first sidewall and a second sidewall extending from the first sidewall, the first sidewall abuts the reflective layer, and the reflective layer is attached to the lower surface of the protrusion.

5. The backlight module as claimed in claim 4, wherein the reflective layer is a film made of reflective material.

6. The backlight module as claimed in claim 1, wherein the light source further comprises two rubber blocks, the rubber blocks are engaged around two ends of the lamp, and the rubber blocks contact the incident surface of the light guide plate.

7. The backlight module as claimed in claim 1, further comprising another light source, wherein the light guide plate further comprises another protrusion extending from another end of the main body, and another light incident surface at the other end of the main body, one side of the other protrusion forms another part of the light emitting surface, another side of the other protrusion is adjacent to the other light incident surface, the other protrusion and the other light incident surface cooperatively form another accommodating space, and the other light source is substantially received in the other accommodating space.

8. The backlight module as claimed in claim 7, wherein each of the light sources comprises a U-shaped reflector and a lamp and the U-shaped reflector is overlapped by the corresponding protrusion.

9. The backlight module as claimed in claim 7, wherein each of the light sources comprises an L-shaped reflector and a lamp, each of lower surfaces of the protrusions has a reflective film thereon, and the lamp is surrounded on three sides by the reflective film and the L-shaped reflector.

10. A liquid crystal display device, comprising:
    a liquid crystal display panel; and
    a backlight module configured for providing light beams to illuminate the liquid crystal display panel, the backlight module comprising:
       a main body;
       a protrusion extending from an end of the main body;
       a main light emitting surface;
       a light incident surface at the end of the main body; and
       a light source comprising a lamp and a reflective member;
       wherein one side of the protrusion forms a part of the light emitting surface, another side of the protrusion is adjacent to the light incident surface, the protrusion and the light incident surface cooperatively form an accommodating space, light source is substantially received in the accommodating space, and at least a part of the reflective member is positioned for preventing light emitted by the lamp from entering the protrusion via said another side of the protrusion.

11. The liquid crystal display device as claimed in claim 10, wherein the reflective member is a U-shaped reflector.

12. The liquid crystal display device as claimed in claim 10, wherein the reflective member comprises a reflective layer formed on said another side of the protrusion, and an L-shaped reflector, with one end of the L-shaped reflector abutting the reflective layer.

13. The liquid crystal display device as claimed in claim 12, wherein the reflective layer is a film made of reflective material.

14. The liquid crystal display device as claimed in claim 10, further comprising a set of optical films covering the main light emitting surface without covering the protrusion.

* * * * *